(12) United States Patent
Leworthy et al.

(10) Patent No.: US 8,640,863 B2
(45) Date of Patent: Feb. 4, 2014

(54) DUST AND PARTICULATE CONTAINMENT SYSTEM FOR CONVEYORS

(75) Inventors: Reg Leworthy, Belleville (CA); Rick Doxtator, Belleville (CA); Scott Sheridan, Belleville (CA); Peter Sorensen, Belleville (CA); George Leverton, Belleville (CA)

(73) Assignee: EMS—Tech Inc., Belleville, Ontario (CA)

(*) Notice: Subject to any disclaimer, the term of this patent is extended or adjusted under 35 U.S.C. 154(b) by 185 days.

(21) Appl. No.: 12/931,619

(22) Filed: Feb. 4, 2011

(65) Prior Publication Data

US 2012/0118708 A1    May 17, 2012

(30) Foreign Application Priority Data

Feb. 5, 2010    (CA) ..................................... 2692137

(51) Int. Cl.
*B65G 21/20*    (2006.01)
(52) U.S. Cl.
USPC ...................... 198/860.1; 198/836.1; 198/636
(58) Field of Classification Search
None
See application file for complete search history.

(56) References Cited

U.S. PATENT DOCUMENTS

| | | | |
|---|---|---|---|
| 3,305,128 A | 2/1967 | Dearsley | |
| 4,140,217 A | 2/1979 | Dell | |
| 4,194,615 A | 3/1980 | Tell et al. | |
| 4,433,777 A * | 2/1984 | Densmore | 198/834 |
| 5,445,260 A * | 8/1995 | Foster | 198/750.3 |
| 5,553,968 A * | 9/1996 | Campbell | 404/108 |
| 7,789,217 B2 | 9/2010 | Fischer et al. | |

FOREIGN PATENT DOCUMENTS

CA    1073394    3/1980

* cited by examiner

*Primary Examiner* — Kavel Singh
(74) *Attorney, Agent, or Firm* — Flynn, Thiel, Boutell & Tanis, P.C.

(57) ABSTRACT

A dust and particulate containment system for an open sided gallery conveyor, having a movable curtain for covering the open side of the conveyor and a trough positioned within and extending along a length of the conveyor. A rail is arranged within the conveyor and a carriage, having an opening for transferring bulk materials therethrough via a sealed connection to a cross conveyor, is positioned to move along this rail. Sealing strips in the trough retain the curtain tautly in place and seal the open side of the conveyor. As each carriage moves along the rail, a spreader frame attached to the carriage biasingly opens the sealing strips, and temporarily frees the curtain from being retained, so that the freed curtain is lifted over the carriage to avoid covering the opening in the carriage, so that transfer of bulk materials in the conveyor can occur through the opening.

18 Claims, 14 Drawing Sheets

DUST AND PARTICULATE CONTAINMENT SYSTEM FOR CONVEYORS

This application claims priority to Canadian Patent Application No. 2,692,137, filed on Feb. 5, 2010, the content of which is herein incorporated by reference.

The present invention relates to a dust and particulate containment system for an open sided gallery conveyor that seals an open side of the gallery conveyor to seal in particulate matter and dust within the gallery conveyor, and to withstand and resist storm wind forces while keeping the entire gallery conveyor enclosed, while allowing movement of a travelling tripper along its length.

BACKGROUND OF THE INVENTION

Bulk storage facilities typically require a material handling system that can move materials into and out of a storage facility for transport. These bulk storage facilities may be used to store salt, coal, sand, fertilizer, or other bulk materials, which can generate dust and particulates.

Material handling systems used to move bulk materials generally include a conveyor and a gallery surrounding and enclosing, at least in part, the conveyor. Such a gallery conveyor is, typically, a tubular steel structure used to enclose a troughed conveyor belt. It is also typically an elevated structure used to span over, for example, roadways, rivers or creeks, or which is for use in ship loader systems, and is primarily used when a product being transported via the conveyor needs to be isolated from its surrounding environment during transport. Industries that typically and commonly use gallery conveyors include power, cement, petroleum by-product, bio-fuel, coal, agricultural products, mineral products and ship loading.

Conventional designs, such as in U.S. Pat. No. 7,789,217, have been utilized to seal gallery conveyors to provide particulate and dust containment within the gallery conveyor. However, there are a number of technical problems in designing such systems. For example, these usually only aim for the minimal necessary dust containment using strips of belting, free moving curtains, etc., and these are usually unable to seal this area to a substantial degree. In certain instances, partial dust and particulate containment is not acceptable to meet environmental standards. In addition, traditional dust and particulate containment systems for gallery conveyors are unable to withstand strong, or storm force, winds while keeping the entire gallery conveyor enclosed, and the dust and particulates therein contained. In addition, conventional dust containment systems, such as stationary hoods, do not allow for movement of equipment such as a travelling tripper (for transferring dust and particulate materials) along the galley conveyor.

It would therefore be advantageous to have a dust and particulate containment system for gallery conveyors able to substantially seal and contain dust and particulate matter within the gallery conveyor.

It would be further advantageous to have a dust and particulate containment system for gallery conveyors that is capable of withstanding and resisting storm wind forces while keeping the entire gallery conveyor substantially enclosed, while allowing easy movement of a travelling tripper along its length.

SUMMARY OF THE INVENTION

The present invention provides an improved dust and particulate containment system for gallery conveyors that is able to substantially seal and contain dust and particulate matter within the gallery conveyor.

The present invention further provides an improved dust and particulate containment system for gallery conveyors that is capable of substantially withstanding and resisting storm wind forces while keeping the entire gallery conveyor enclosed, while at the same time allowing easy movement of a travelling tripper along its length. The function of this element is discussed further below in relation to the drawings.

According to a first broad aspect of an embodiment of the present invention, there is disclosed a dust and particulate containment system for a gallery conveyor having at least one open side and a conveyor belt thereon for transferring bulk materials therein, the system comprising:

a movable curtain for covering the at least one open side of the gallery conveyor;

a trough positioned within the gallery conveyor and extending along a substantial length of the conveyor;

a rail positioned within the gallery conveyor, and extending alongside a substantial length of the trough;

a carriage adapted for movement along the rail and having an opening for transferring bulk materials therethrough;

sealing means adapted to retain the curtain in place and substantially seal a substantial portion of the trough; and     a spreader frame attached to the carriage, the spreader frame being adapted to biasingly open the sealing means and free the curtain from retention with the sealing means when brought into contact therewith, whereby, through movement of the carriage along the rail, the curtain is lifted over the carriage and avoid covering of the opening in the carriage.

According to a second broad aspect of an embodiment of the present invention, there is disclosed a dust and particulate containment system for a gallery conveyor having at least one open side and a conveyor belt thereon for transferring bulk materials therein, the system comprising:

a movable curtain for covering the at least one open side of the gallery conveyor;

a trough positioned within the gallery conveyor and extending along a substantial length of the conveyor;

a rail positioned within the gallery conveyor, and extending alongside a substantial length of the trough;

a carriage adapted for movement along the rail and having an opening for transferring bulk materials therethrough;

sealing means adapted to retain the curtain in place and substantially seal a substantial portion of the trough;

a sprocket assembly attached to the carriage, the sprocket assembly being adapted for moving with the carriage along the rail; and     a spreader frame attached to the sprocket assembly, the sprocket assembly being adapted to biasingly open the sealing means and free the curtain from retention with the sealing means when brought into contact therewith, whereby, through movement of the carriage along the rail, the curtain is lifted over the carriage and avoid covering of the opening in the carriage.

According to a third broad aspect of an embodiment of the present invention, there is disclosed a dust and particulate containment system for a gallery conveyor, the gallery conveyor including a conveyor belt, a conveyor belt housing having an access opening in a side wall in a travel direction of the conveyor belt, the containment system comprising:

(i) a trough adapted to be affixed to the gallery conveyor to extend in the travel direction and adjacent the access opening;

(ii) a curtain having an upper region adapted to be securable to the side wall for covering the access opening, and a lower curtain region receivable within the trough;

(iii) sealing means securable to the trough for selectively retaining and releasing the lower curtain region;
(iv) a rail means securable within the housing;
(v) a carriage means adapted to travel along the rail means adjacent the conveyor belt, and having a belt access means to selectively provide access to the conveyor belt, the carriage means comprising
(a) spreading means adapted to open the sealing means; and
(b) lifting means operable on the lower curtain region to retain a portion of the curtain in a lifted position to expose the belt access means.

Preferably, the curtain is adapted to cover a substantial complete length of the at least one open side of the gallery conveyor. More preferably, the curtain further comprises a plurality of vertically hanging individual section pieces which are adapted to be attachable to one another; in which case preferably the plurality of vertically hanging individual section pieces are adapted to be attached to one another through releasable connections.

Preferably, the carriage further comprises a first portion and a second portion which are adapted to be integrally connected together; more preferably, the first portion and the second portion are adapted to be integrally connected together on interior surfaces thereof at a substantially central portion of the carriage.

Preferably, the system further comprises a 'T' bar adapted to be positioned at a top end of the open side of the gallery conveyor, more preferably the dust curtain is adapted to be affixed at its top end to the 'T' bar.

Preferably, a bottom of the curtain is adapted to be affixed to a length of chain to weigh the curtain down; more preferably, the bottom of the curtain is adapted to be positioned within the trough at a bottom of the gallery conveyor.

Preferably, the curtain is adapted to be received between, and operably able to pass over, the integrally connected first portion and the second portion of the carriage.

Preferably, the system further comprises sealing strips adapted to be positioned within the trough; preferably, the sealing strips are adapted to retain the curtain in the trough to ensure substantial sealing of the conveyor during movement of bulk materials along the conveyor, and are adapted to run a substantial length of the trough.

Preferably, the system further comprises at least two rollers adapted to be positioned between the first portion and the second portion.

Preferably, the system further comprises a rotatable belt adapted to be positioned around the at least two rollers for effecting movement of the curtain over the integrally connected first portion and the second portion of the carriage. More preferably, the system further comprises a motor adapted for rotating the belt, the motor being positioned on one of the first portion and the second portion of the carriage.

This system has the major advantage of being able to substantially seal and contain dust and particulate matter within the gallery conveyor, and which is capable of substantially withstanding and resisting storm wind forces in keeping the entire gallery conveyor enclosed, while allowing easy movement of a travelling tripper along its length.

BRIEF DESCRIPTION OF THE DRAWINGS

The embodiments of the present invention will now be described by reference to the following figures, in which identical reference numerals in different figures indicate identical elements and in which.

DETAILED DESCRIPTION OF THE INVENTION

The invention will be described for the purposes of illustration only in connection with certain embodiments; however, it is to be understood that other objects and advantages of the present invention will be made apparent by the following description of the drawings according to the present invention. While a preferred embodiment is disclosed, this is not intended to be limiting. Rather, the general principles set forth herein are considered to be merely illustrative of the scope of the present invention and it is to be further understood that numerous changes may be made without straying from the scope of the present invention.

The present invention consists of a dust curtain containment system, which can preferably be used in conjunction with a gallery conveyor for substantially sealing the conveyor during movement of bulk materials along the conveyor. Typically, such material is loaded from a landside store out to, for example a ship. As an example of how the present invention could be utilized in conjunction with a gallery conveyor, a yard conveyor would carry the bulk materials from a bulk storage facility into the gallery conveyor, and the bulk materials from this gallery conveyor would then be relayed, via a travelling tripper, from the gallery conveyor to a cross conveyor which would then carry the bulk material to a ship loader boom to be discharged, for example, into the hold of a ship or other mode of transportation.

Figure 1:
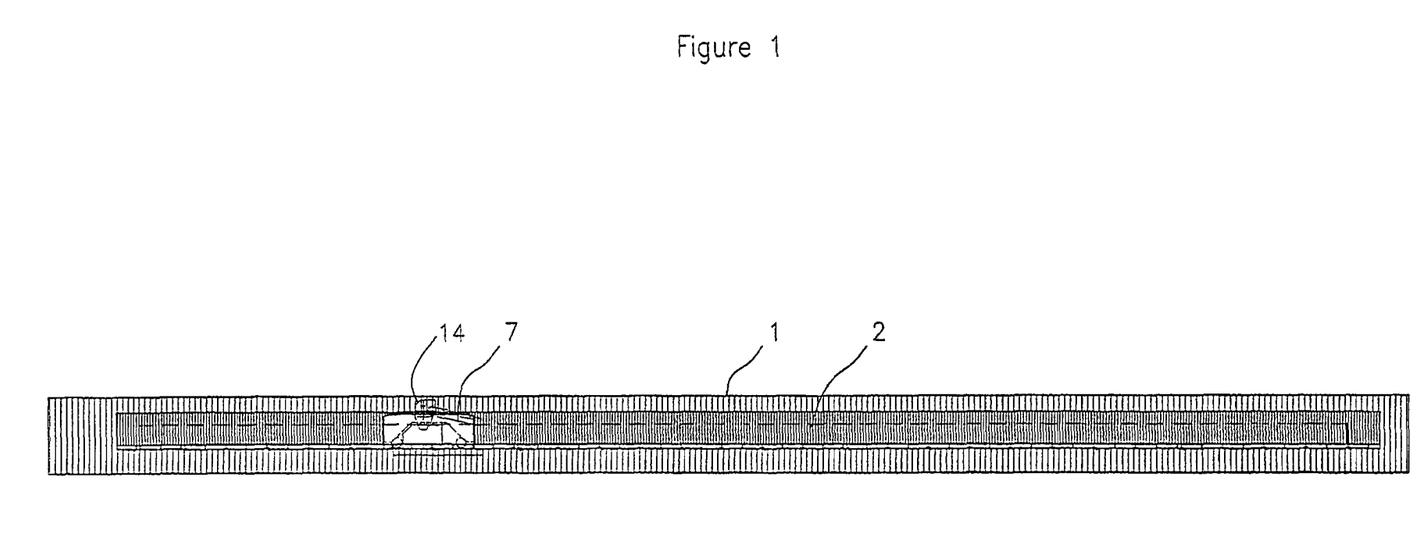
FIG. 1 is a side view of a gallery conveyor having an embodiment of the carriage of the present invention and a travelling tripper positioned therein.
Figure 7:
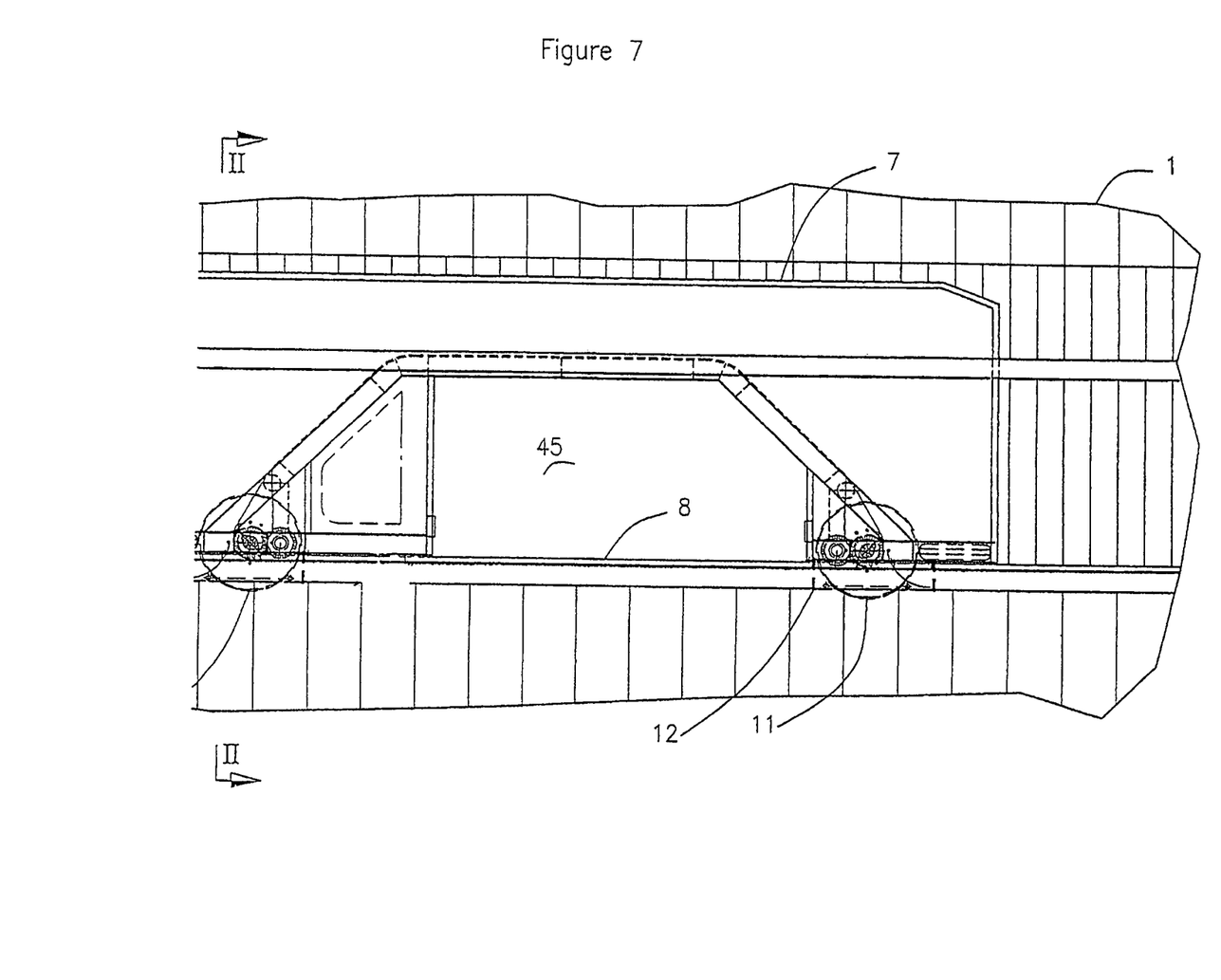
FIG. 7 is a further enlarged side view of a gallery conveyor having an embodiment of the carriage of the present invention positioned therein.

With reference to FIG. 1, the present invention is a dust and particulate containment system for use with a gallery conveyor 1, which typically has at least one side that is open sided, and the dust and particulate containment system of the present invention seals the open side of the gallery conveyor 1, while allowing a travelling tripper 14 to move along its length. A movable carriage 7 is mounted in the gallery conveyor, and the travelling tripper 14 is constructed and arranged for attachment to the carriage 7. With reference also to FIG. 7, a central opening 45 is present within the carriage, this being the point through which bulk materials are relayed, via the travelling tripper 14, from the gallery conveyor 1 to a cross conveyor (not shown) for eventual discharge into the hold of a ship, or other mode of transportation, as hereinafter described.

Figure 4:
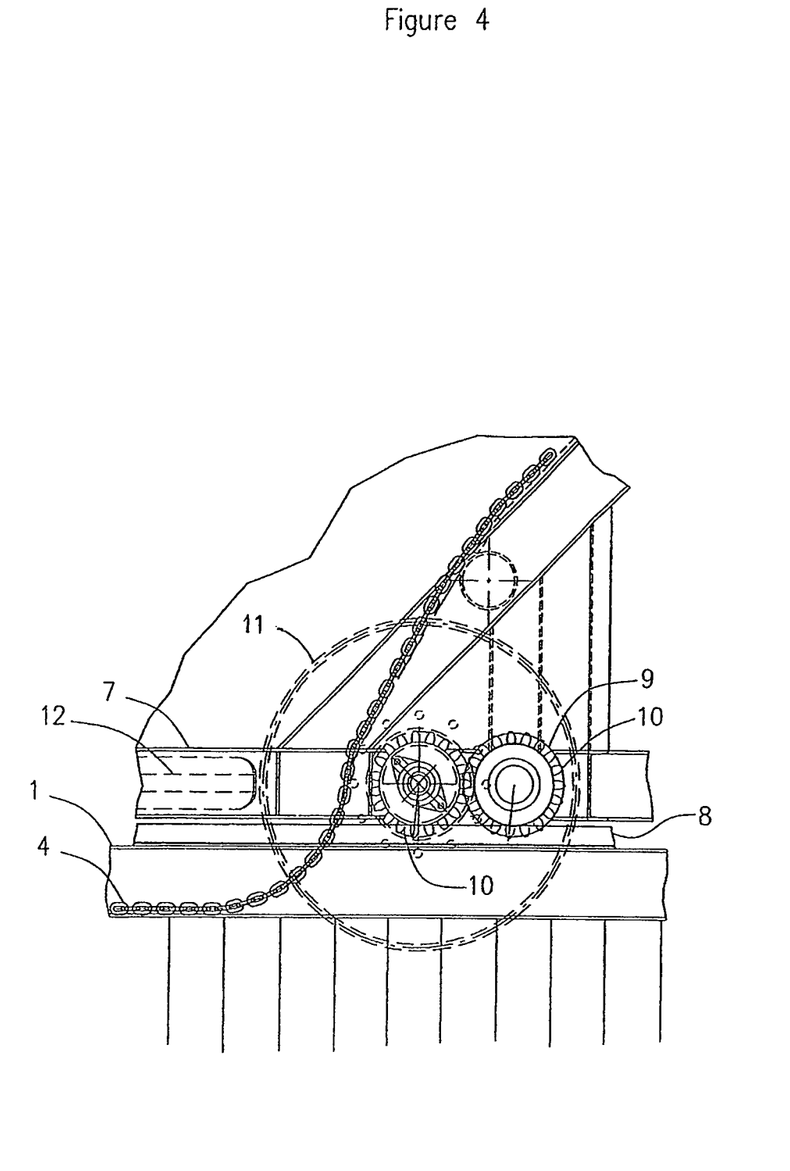
FIG. 4 is a partial cut-away side view of an embodiment of the lower end of the dust curtain of the present invention being raised from the bottom of the gallery conveyor by the rotating drum when movement of the carriage is effected.
Figure 5:
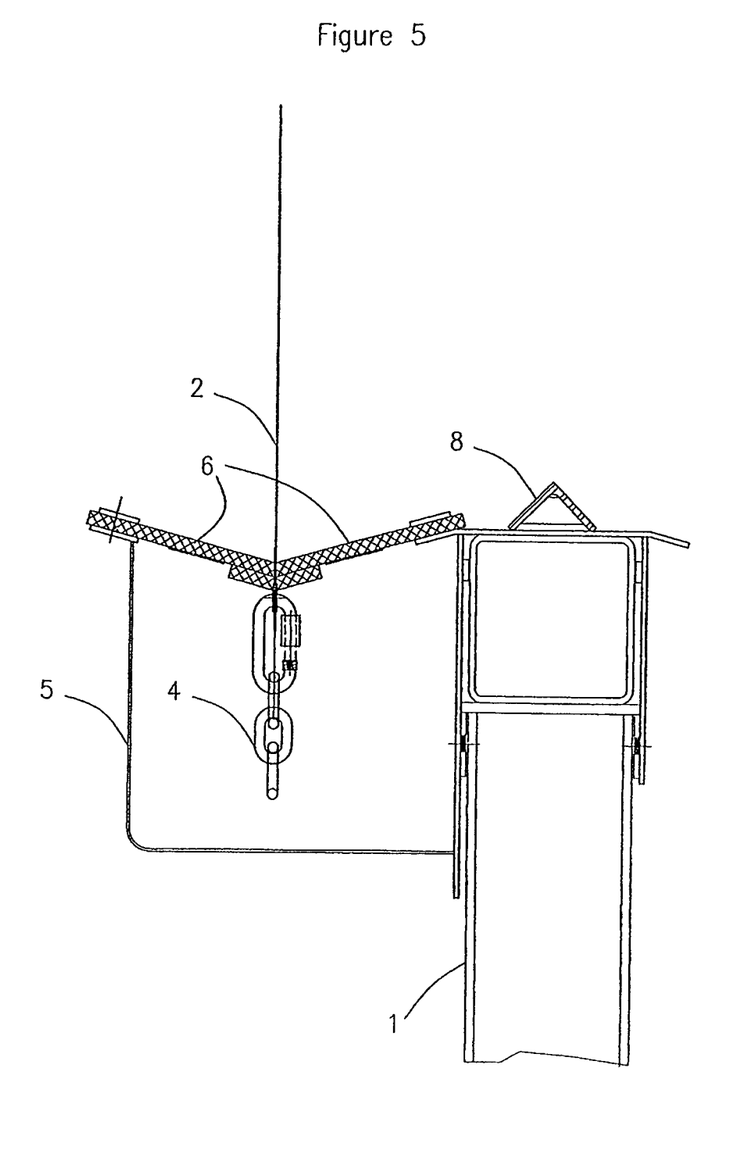
FIG. 5 is a cross-sectional view of an embodiment of the lower end of the dust curtain of the present invention within the bottom of the trough, the trough being sealed with downwardly angled sealing strips.

With reference to FIG. 5, this carriage 7 travels within the gallery conveyor 1 along a rail 8 that is mounted alongside the gallery conveyor 1, the rail 8 spanning a length of the gallery conveyor 1. The carriage 7, by virtue of its connection to the travelling tripper 14, moves with the attached travelling tripper 14, so that, with reference to FIGS. 4 and 9, as the travelling tripper 14 is moved, the carriage wheels 9 of the carriage 7 resting on the rail 8 rotate, thus causing the carriage 7 to correspondingly rotate along the rail 8. It will, of course, be understood that movement of the traveling tripper 14 and carriage 7 can be effected manually, or by means of a motor or other device, as would be apparent to one skilled in the art.

Figure 6:
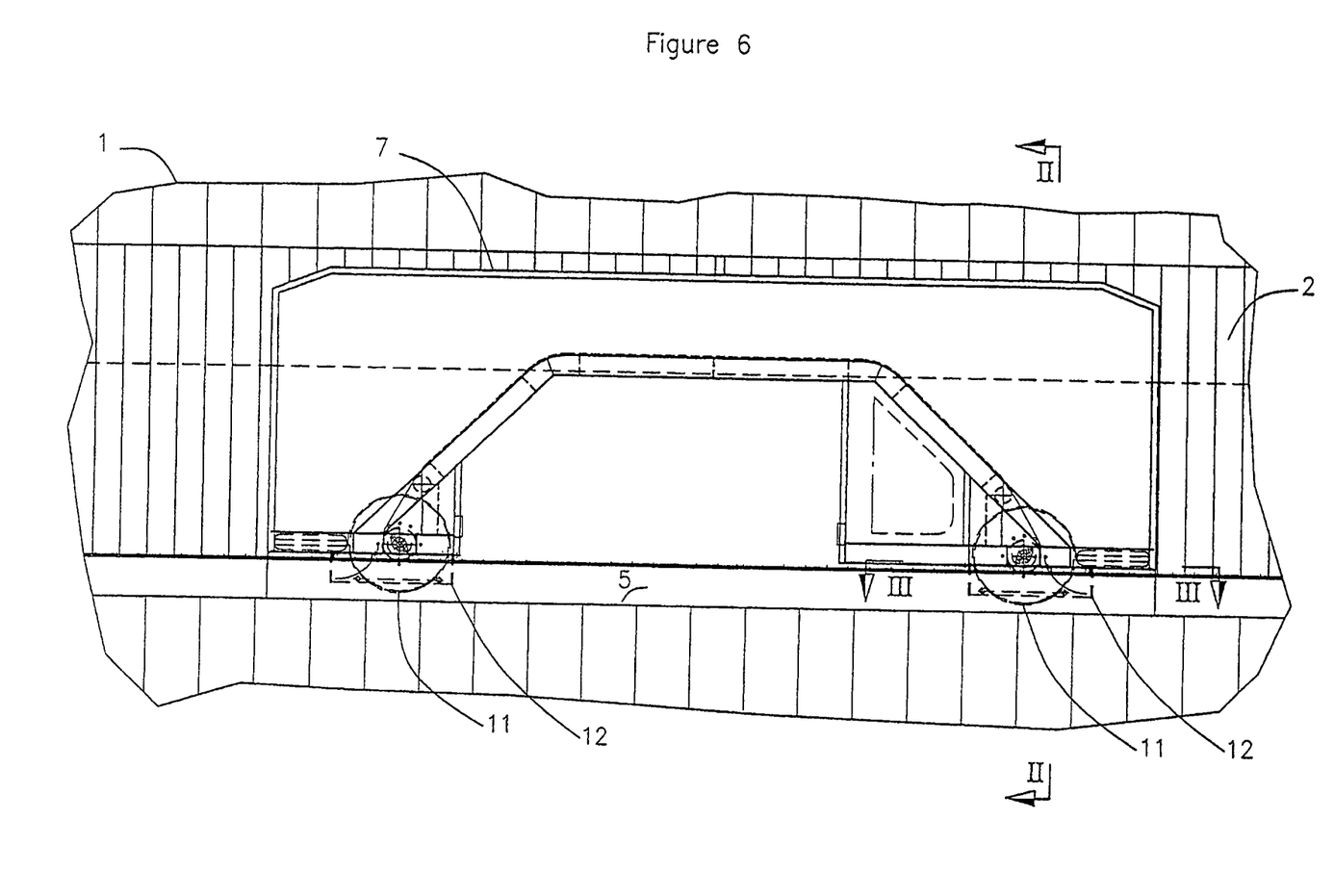
FIG. 6 is an enlarged side view of a gallery conveyor having an embodiment of the carriage of the present invention positioned therein.

With reference to FIGS. 1, 6 and 7, a dust curtain 2 is positioned to cover a substantial complete length of the open side of the gallery conveyor 1. The dust curtain 2 is preferably comprised of vertically hanging individual section pieces which are preferably attached to one another through releasable connections, such as Velcro™ zippers, snaps or other fastening means known to those skilled in the art. In this manner, individual sections of the curtain 2 can be easily replaced, if necessary. However, it is to be understood that the curtain 2 will comprise, when the individual sections are connected to one another (and retained under tension at the top and bottom) a substantially solid sheet of material, with a view to substantially sealing the conveyor during movement of bulk materials along the conveyor.

Figure 2:
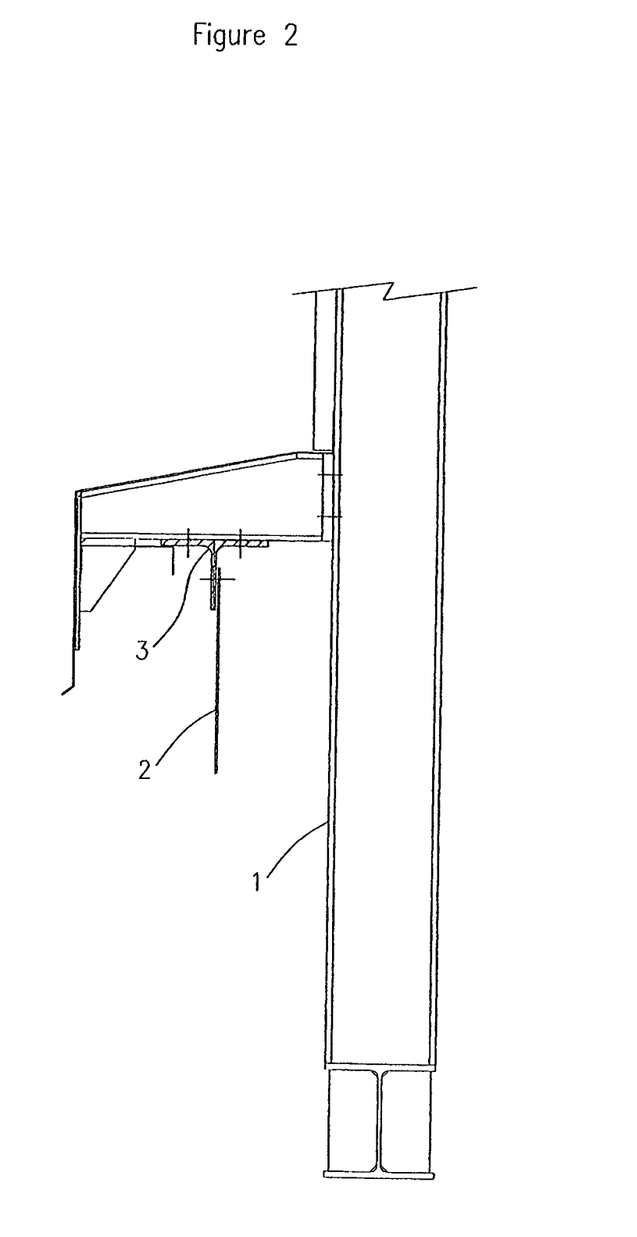
FIG. 2 is a cross-sectional view of an embodiment of the dust curtain of the present invention positioned within the gallery conveyor.
Figure 3:
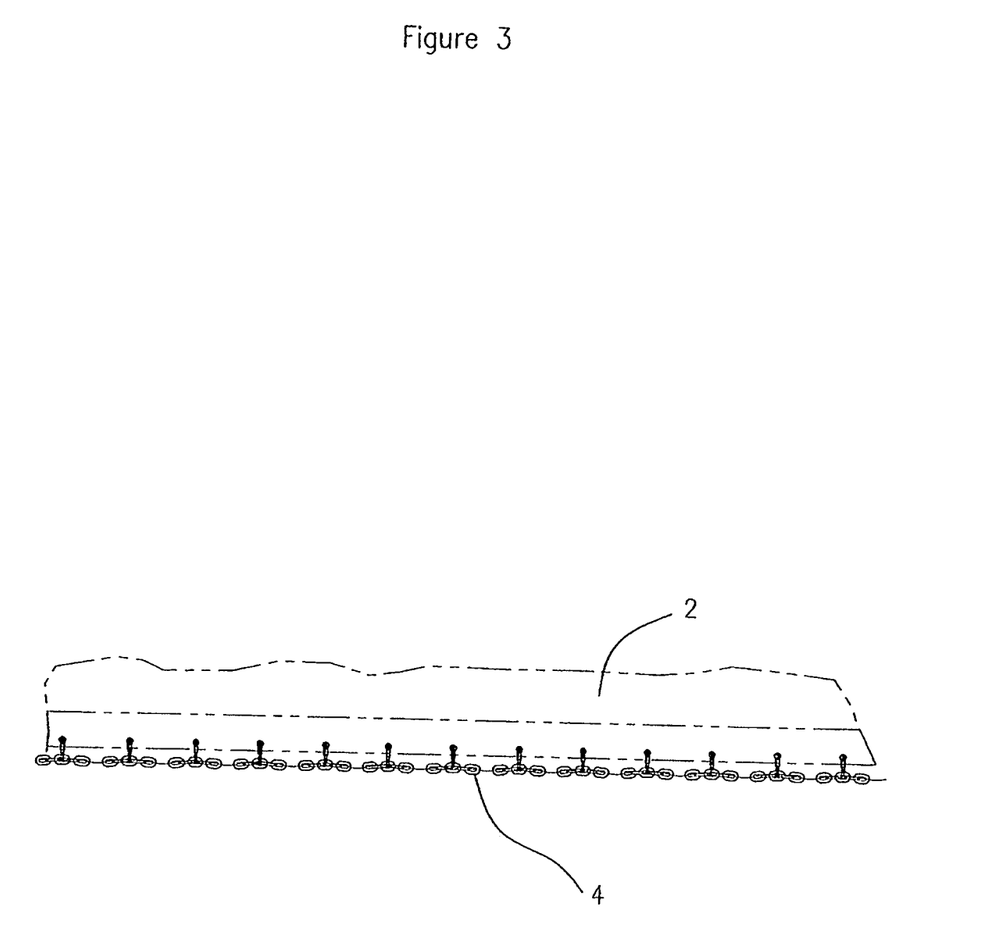
FIG. 3 is a partial cut-away side view of an embodiment of the lower end of the dust curtain of the present invention.

As can be seen in FIG. 2, the dust curtain 2 is affixed at its top end in specific, spaced apart intervals, to a 'T' bar 3 positioned at a top end of the open side of the gallery conveyor 1. The bottom of the curtain 2 is affixed to a specific length of chain 4 to weigh the curtain 2 down, as can be seen in FIGS. 3 and 5, this bottom section of the curtain 2, including the portion with the chain 4 connected thereto, being positioned within a trough 5 at the bottom of the gallery conveyor 1. At either end of the gallery conveyor 1 a portion of the curtain 2 remains in the trough 5 at all times, so as to provide a leading edge for the movement of the curtain 2.

Figure 10:
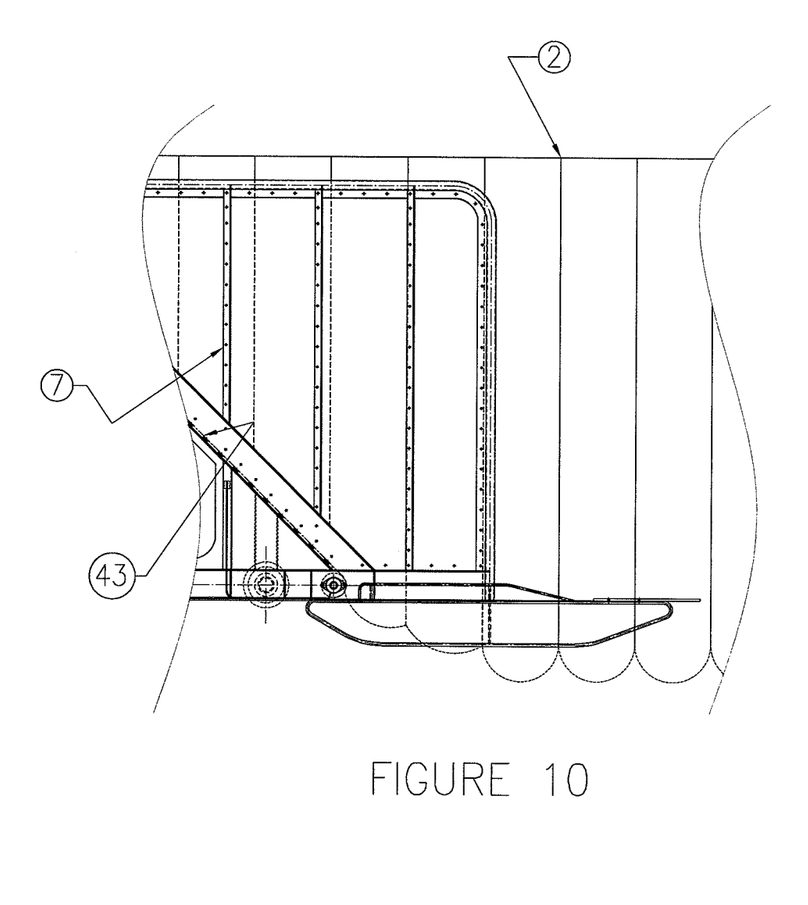
FIG. 10 is a perspective view of the carriage receiving an embodiment of the dust curtain therein.
Figure 11:
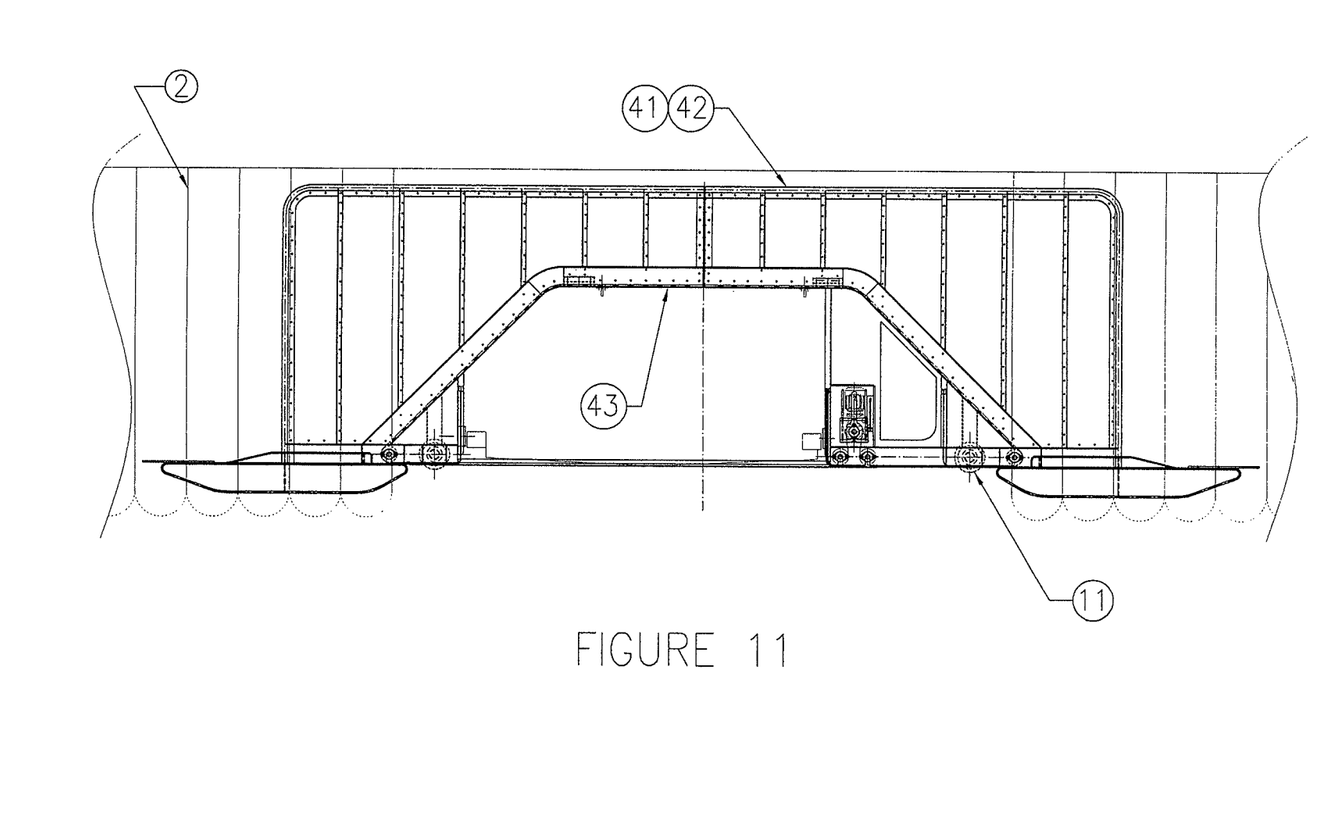
FIG. 11 is a perspective view of an embodiment of the two halves of the carriage that are connected together at a central portion thereof.
Figure 12:
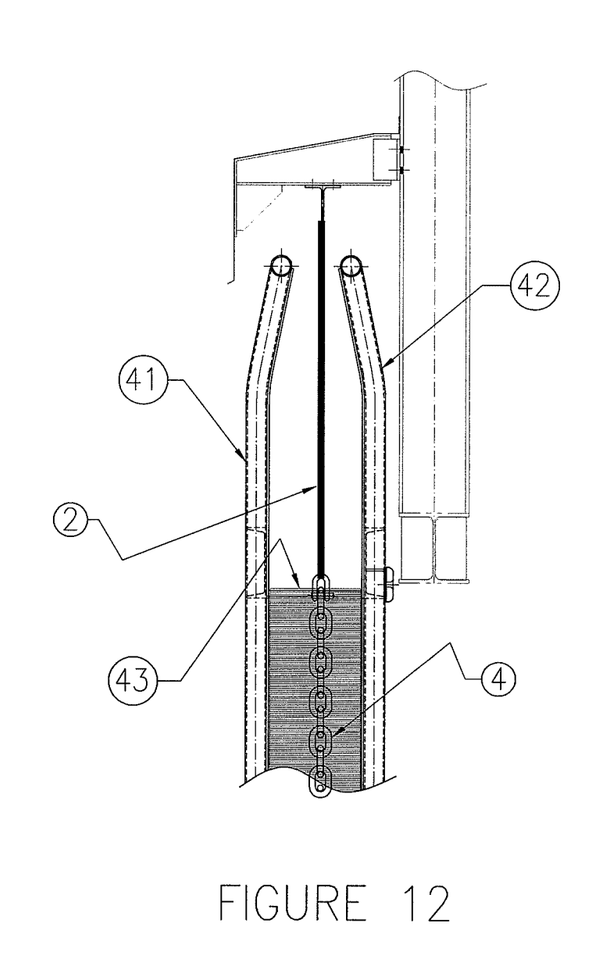
FIG. 12 is a top view from an upper surface of the carriage, looking down, showing the connection of the two halves of the carriage at a central portion thereof, and which illustrates the carriage receiving an embodiment of the dust curtain therein.
Figure 13:
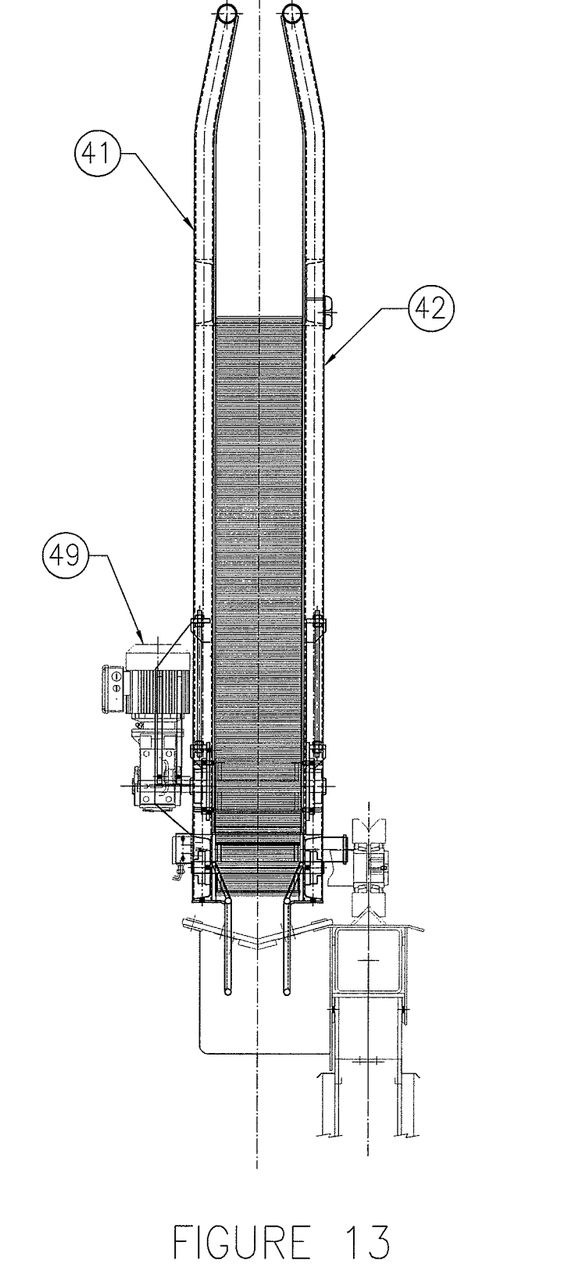
FIG. 13 is a perspective view of a preferred embodiment of the two halves of the carriage that are connected together at a central portion thereof.

With reference to FIGS. 11 and 13, the carriage 7 preferably is comprised of two halves 41, 42 which are integrally connected together, on interior surfaces thereof, at a substantially central portion 43 of the carriage 7, discussed further below in relation to FIG. 12. As shown in FIG. 10, the curtain 2 is designed to be received between, and pass through, these two halves 41, 42 as the carriage 7 moves along the rail 8, as hereinafter described.

The trough 5 is substantially rectangular in nature, though variations to this are possible, as the trough itself 5 could be a bottomless channel, for example. The trough 5 houses the chain 4 and bottom portion of the curtain 2, as can be seen in FIG. 5, the curtain being rigidly retained in the trough 5 by sealing strips 6, the sealing strips 6 acting to keep the curtain 2 taut along its length, and thus ensure substantial sealing of the conveyor during movement of bulk materials along the conveyor. In a preferred embodiment, as seen in FIG. 5, at least two sealing strips 6 run a length of the trough 5. The sealing strips 6 meet and are reinforced in the middle of the trough 5 and are angled downwardly such that if the curtain 2 is pulled or lifted upwardly, such as during a storm force wind, the sealing strips 6 apply increasing pressure against the curtain itself to retain the curtain 2 in place and substantially seal the gallery conveyor 1. The sealing strips 6 are comprised of interconnected individual section pieces, preferably made of rubber, that extend along its full length.

Figure 14:
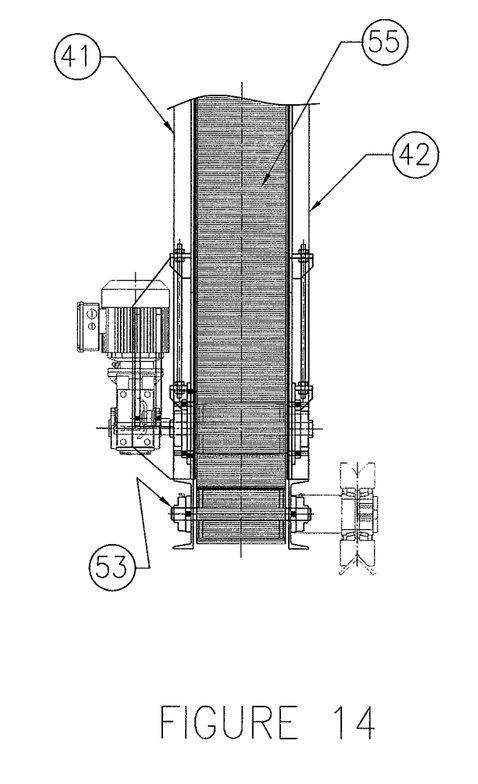
FIG. 14 is a partial view, looking down, of an embodiment of the belt positioned around the roller positioned between the two halves of the carriage.

In a preferred embodiment, as noted previously, the curtain 2 is received between, and passes through, the two halves 41, 42 of the carriage. Referring to FIG. 13, an electric motor 49 is connected to one of the two halves 41, 42 of the carriage 7, the motor 49 being in operative connection with roller 53, and with at least one other roller (not shown), these rollers being operably positioned between the two halves 41, 42 of the carriage 7. As shown in FIG. 14, a rotatable belt 55 is connected around each of the rollers, whereby, when the motor 49 is utilized, the belt 55 is rotated around the rollers, in order to help to lift the curtain 2 slightly out of the trough 5 as the carriage 7 and travelling tripper 14 move along the rail 8, so as to assist in keeping the curtain 2 taut and preventing the curtain from bunching up unnecessarily.

Figure 8:
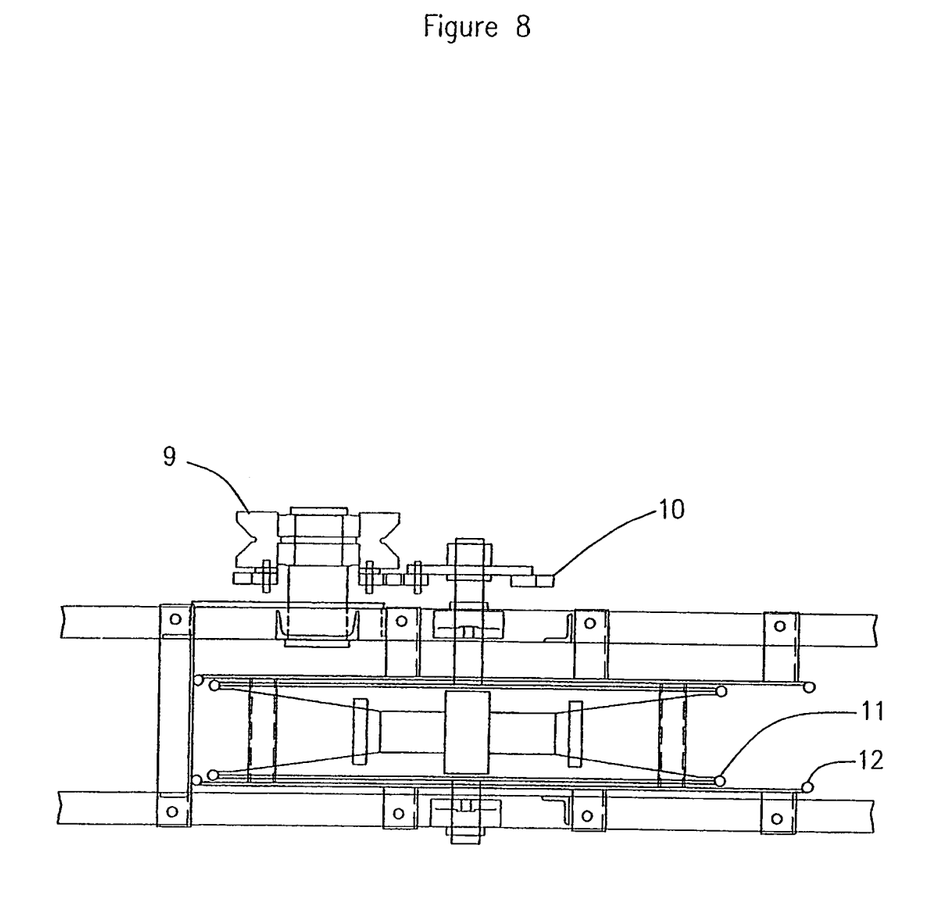
FIG. 8 is a sectional view along the lines in FIG. 6 showing the top of a trough having an embodiment of the carriage of the present invention positioned therein.
Figure 9:
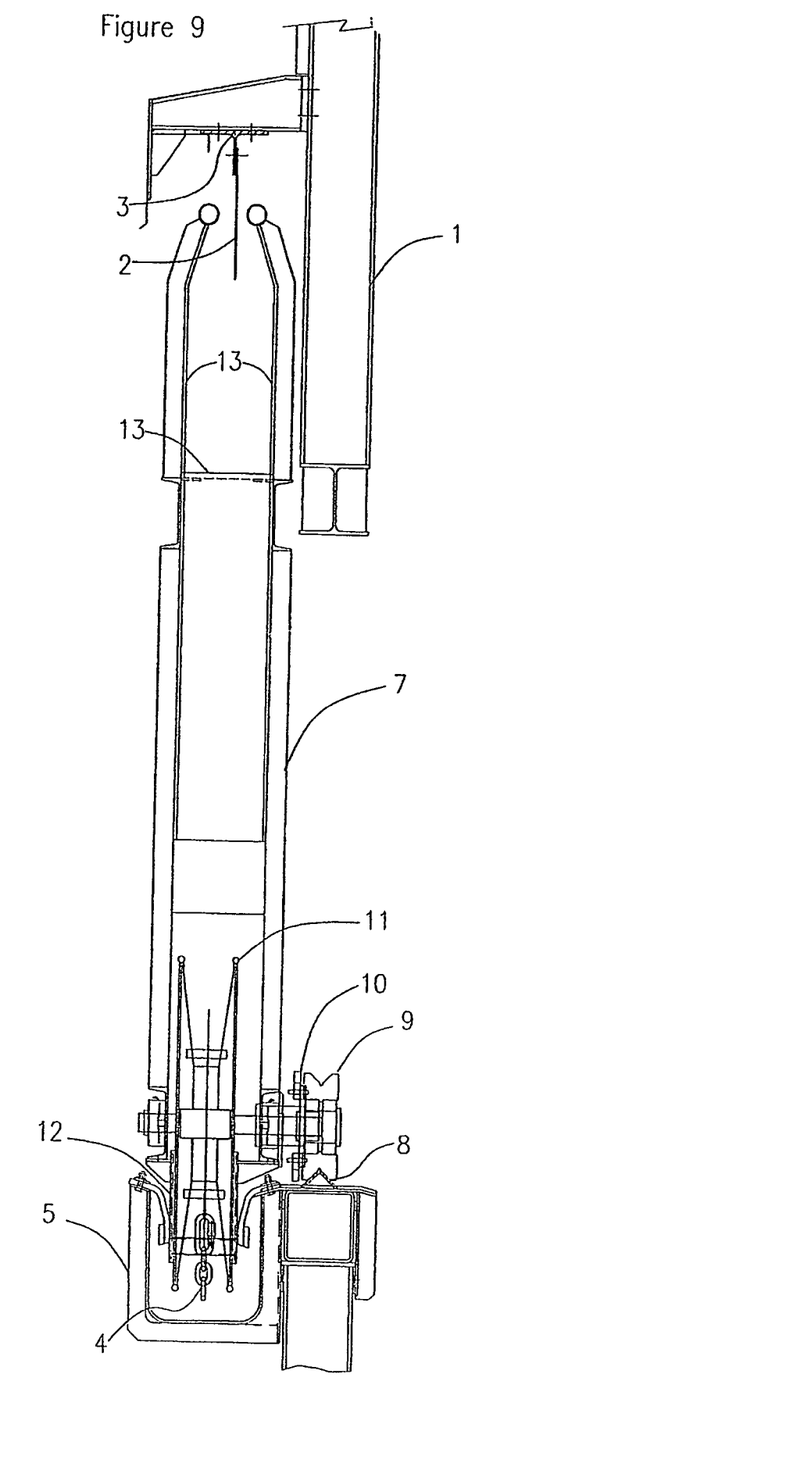
FIG. 9 is a sectional view along the lines II-II in FIG. 7, showing the side of an embodiment of the dust and particulate containment system of the present invention positioned within the trough.

In an alternative embodiment, with references to FIGS. 4 and 9, the carriage wheels 9 of the carriage 7 are connected to sprockets 10 which in turn rotate another sprocket attached to a large rotatable drum 11, it being understood that the configuration of these sprockets rotate the drum 11 in the opposite direction that the carriage wheels 9 are turning. This is so that, with reference to FIGS. 8 and 9, the drum 11 will help lift the curtain 2 slightly out of the trough 5 as the carriage 7 and travelling tripper 14 move along the rail 8, so as to assist in keeping the curtain 2 taut and preventing the curtain from bunching up unnecessarily. Preferably, each end of the carriage 7 will possess one set of the wheel/gear/drum arrangement, as seen in FIGS. 6 and 7, so that regardless of which direction the carriage 7 travels along the rail 8 the above-noted effect will be achieved. As can be seen in FIG. 9, the drum 11 is positioned within the trough and is protected by spreader frames 12, as hereinafter described, which are connected thereto.

In operation, when the bulk materials (not shown) contained within the gallery conveyor 1 are to be relayed, via the travelling tripper 14, from the gallery conveyor 1 to a cross conveyor (not shown) for eventual discharge into the hold of a ship or other mode of transportation, it is necessary to at least partially move the curtain 2 out of the way of the opening 45 in the curtain 2, as seen in FIGS. 6 and 7, and as hereinafter described.

As noted previously, the carriage 7 is connected to the travelling tripper 14 and moves with the travelling tripper 14, so that, as the travelling tripper 14 moves, the carriage wheels 9 resting on the rail 8 rotate, thus moving the carriage 7 along the rail 8. As noted previously, the carriage 7 is comprised of two halves 41, 42 which are integrally connected together at a substantially central portion 43 thereof, and the curtain 2 is received between, and passes through, these two halves 41, 42 as the carriage 7 moves along the rail 8. As the carriage 7 and the attached travelling tripper 14 move along the rail 8 the spreader frame 12 (which is connected to the carriage 7) is brought into contact with the sealing strips 6, and opens the sealing strips 6, shown in FIG. 5, covering the trough 5, by forcing the sealing strips 6 downwardly, as the carriage 7 continues movement in passing along the rail 8, and thus allowing the curtain 2 to be freed from its rigid retention by the sealing strips 6.

Once the sealing strips 6 are removed from their rigid retention of the curtain 2, as shown in FIG. 4, the lower end of the curtain 2, having the chain 4 connected thereto, is lifted upwardly out of the trough 5 so that a bottom portion of the curtain 2 may pass, as the carriage 7 moves along the rail 8, up and over the substantially central portion 43 of the carriage 7 at which the two halves 41, 42 of the carriage are connected, as shown in FIG. 12. Once the lower end of the curtain 2 passes over this central portion 43, and is out of the way, the opening 45 in the carriage 7 continues to be revealed and not covered in any way, and this movement of the lower end of the curtain 2 over this central portion 43 creates the passageway for the bulk materials to be moved, through opening 45, from the gallery conveyor 1 to the cross conveyor (not shown) via the travelling tripper 14 for eventual discharge into the hold of a ship or other mode of transportation. It should be noted, however, that this opening 45 in the carriage does not permit access to the inside of the gallery conveyor by outside elements, such as wind, because this opening 45 is the point at which a cross conveyor (not shown) will be connected to the gallery conveyor 1, for the removal of bulk materials. As such, the entire outside open surface of the gallery conveyor 1 is substantially continually sealed during the movement and transfer of the bulk materials by virtue of its connection to the cross conveyor.

Once the carriage 7 and the attached travelling tripper 14 continue to move along the rail 8, and the spreader frames 12 are no longer in contact with the opened sealing strips 6, the lower end of the curtain 2 will, by virtue of its having the weighted chain 4 at an end thereof, gravitationally assume a position towards a bottom of the trough 5, and the sealing strips 6 will then bias back into their normal position as shown in FIG. 5 to rigidly seal and retain the curtain 2 in place within the trough 5, thus keeping the curtain 2 taut.

Low friction nonmetal liner plates, such as UHMW or TYVAR plates (not shown), can be used to line a bottom portion of the carriage 7 and are used to reduce friction and reduce risk of tearing of the curtain 2. In a preferred embodiment, the leading and non-leading sides of the carriage 7 are symmetrical as the carriage 7 travels in either direction along the gallery conveyor 1.

It will be apparent to those skilled in this art that various modifications and variations may be made to the embodiments disclosed herein, consistent with the present invention, without departing from the spirit and scope of the present invention.

Other embodiments consistent with the present invention will become apparent from consideration of the specification and the practice of the invention disclosed therein. Accordingly, the specification and the embodiments are to be considered exemplary only, with a true scope and spirit of the invention being disclosed by the following claims.

The embodiments of the invention in which an exclusive property or privilege is claimed are defined as follows:

1. A dust and particulate containment system for a gallery conveyor having at least one open side and a conveyor belt thereon for transferring bulk materials therein, the system comprising:

a movable curtain for covering the at least one open side of the gallery conveyor;

a trough positioned within the gallery conveyor and extending along a length of the conveyor;

a rail positioned within the gallery conveyor, and extending alongside a length of the trough;

a carriage adapted for movement along the rail and having an opening for transferring bulk materials therethrough;

a seal adapted to retain the curtain in place and seal a portion of the trough; and a spreader frame attached to the carriage, the spreader frame being adapted to biasingly open the seal and free the curtain from retention with the seal when brought into contact therewith, whereby, through movement of the carriage along the rail, the curtain is lifted over the carriage and avoids covering of the opening in the carriage.

2. The dust and particulate containment system of claim 1, wherein the curtain is adapted to cover a complete length of the at least one open side of the gallery conveyor.

3. The dust and particulate containment system of claim 1, wherein the curtain further comprises a plurality of vertically hanging individual section pieces which are adapted to be attachable to one another.

4. The dust and particulate containment system of claim 3, wherein the plurality of vertically hanging individual section pieces are adapted to be attached to one another through releasable connections.

5. The dust and particulate containment system of claim 1, wherein the carriage further comprises a first portion and a second portion which are adapted to be integrally connected together.

6. The dust and particulate containment system of claim 5, wherein the first portion and the second portion are adapted to be integrally connected together on interior surfaces thereof at a central portion of the carriage.

7. The dust and particulate containment system of claim 1, wherein the system further comprises a 'T' bar adapted to be positioned at a top end of the at least one open side of the gallery conveyor.

8. The dust and particulate containment system of claim 7, wherein the dust curtain is adapted to be affixed at a top end thereof to the 'T' bar.

9. The dust and particulate containment system of claim 1, wherein a bottom of the curtain is adapted to be affixed to a length of chain to weigh the curtain down.

10. The dust and particulate containment system of claim 9, wherein the bottom of the curtain is adapted to be positioned within the trough at a bottom of the gallery conveyor.

11. The dust and particulate containment system of claim 6, wherein the curtain is adapted to be received between, and operably able to pass over, the integrally connected first portion and the second portion of the carriage.

12. The dust and particulate containment system of claim 1, wherein the system further comprises sealing strips adapted to be positioned within the trough.

13. The dust and particulate containment system of claim 12, wherein the sealing strips are adapted to retain the curtain in the trough to ensure sealing of the conveyor during movement of bulk materials along the conveyor.

14. The dust and particulate containment system of claim 13, wherein the sealing strips are adapted to run a length of the trough.

15. The dust and particulate containment system of claim 11, wherein the system further comprises at least two rollers adapted to be positioned between the first portion and the second portion.

16. The dust and particulate containment system of claim 15, further comprising a rotatable belt adapted to be positioned around the at least two rollers for effecting movement of the curtain over the integrally connected first portion and the second portion of the carriage.

17. The dust and particulate containment system of claim 16, wherein the system further comprises a motor adapted for rotating the belt, the motor being positioned on one of the first portion and the second portion of the carriage.

18. A dust and particulate containment system for a gallery conveyor having at least one open side and a conveyor belt thereon for transferring bulk materials therein, the system comprising:
- a movable curtain for covering the at least one open side of the gallery conveyor;
- a trough positioned within the gallery conveyor and extending along a length of the conveyor;
- a rail positioned within the gallery conveyor and extending alongside a substantial length of the trough;
- a carriage adapted for movement along the rail and having an opening for transferring bulk materials therethrough;
- a seal adapted to retain the curtain in place and seal a portion of the trough;
- a sprocket assembly attached to the carriage, the sprocket assembly being adapted for moving with the carriage along the rail; and
- a spreader frame attached to the sprocket assembly, the sprocket assembly being adapted to biasingly open the seal and free the curtain from retention with the seal when brought into contact therewith, whereby, through movement of the carriage along the rail, the curtain is lifted over the carriage and avoids covering of the opening in the carriage.

* * * * *